United States Patent [19]

Gooch

[11] 4,291,352

[45] Sep. 22, 1981

[54] MULTICHANNEL TRANSDUCER STRUCTURE WITH IMPROVED INTERCHANNEL CROSS TALK REJECTION

[75] Inventor: Beverley R. Gooch, Sunnyvale, Calif.

[73] Assignee: Ampex Corporation, Redwood City, Calif.

[21] Appl. No.: 125,001

[22] Filed: Feb. 27, 1980

[51] Int. Cl.³ .................. G11B 5/11; G11B 5/22; G11B 5/28

[52] U.S. Cl. ........................ 360/121; 360/122; 360/128; 360/124

[58] Field of Search ........... 360/121, 122, 123, 124, 360/125–127, 128–129

[56] References Cited

U.S. PATENT DOCUMENTS

| | | | |
|---|---|---|---|
| 3,591,733 | 7/1971 | Pflughaupt | 360/124 |
| 3,789,156 | 1/1974 | Bessette | 360/124 |
| 3,895,002 | 7/1975 | Ridgway et al. | 360/128 |
| 3,909,932 | 10/1975 | Kroon | 360/121 |
| 4,170,033 | 10/1979 | Ridgway et al. | 360/121 |

*Primary Examiner*—Alfred H. Eddleman
*Attorney, Agent, or Firm*—Robert G. Clay; Elizabeth E. Strnad

[57] ABSTRACT

Members of magnetic material are attached at a front end surface of a multichannel magnetic transducer to form an asymmetric magnetic circuit. A member is attached to one magnetic pole of each pair of poles forming a transducing channel. The members on consecutive adjacent channels are attached alternatively to poles located on the opposite sides of the transducer front end surface. The members are placed out of contact with the recording medium and at a distance from the transducing gaps to prevent magnetic coupling therewith, respectively.

17 Claims, 5 Drawing Figures

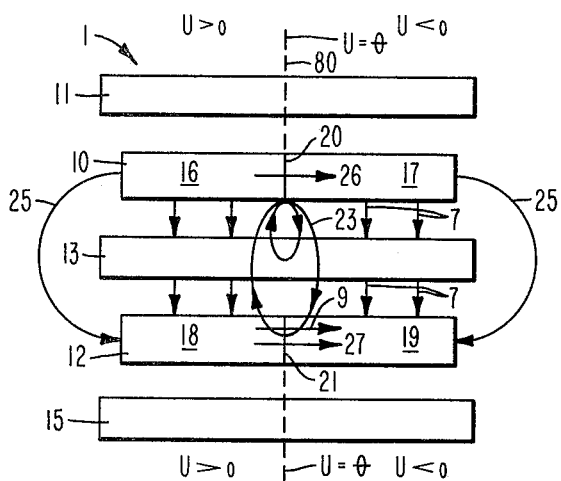
FIG_1 (PRIOR ART)
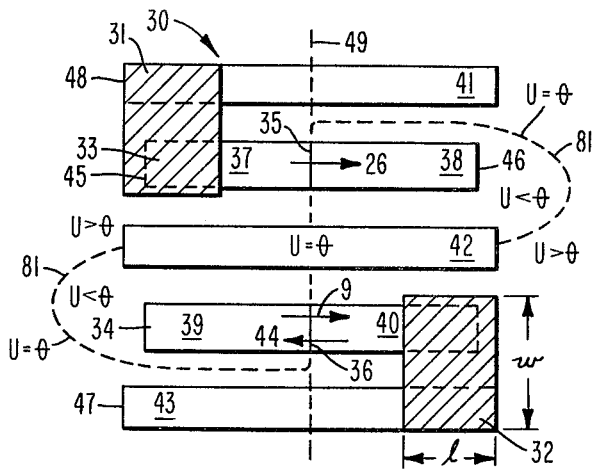
FIG_2
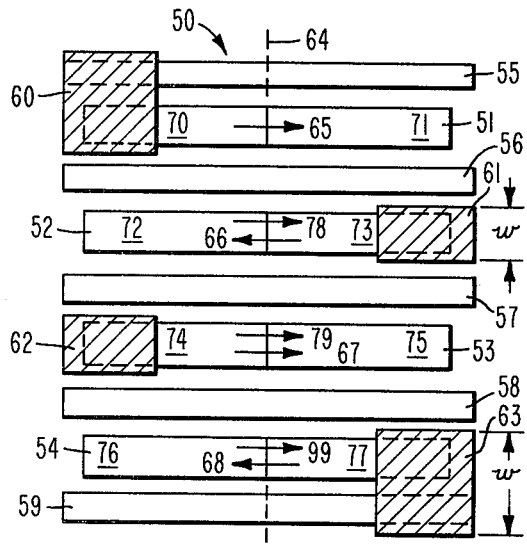
FIG_3
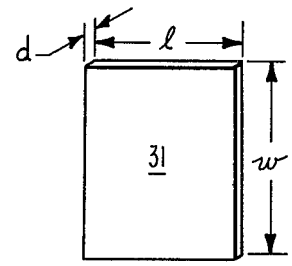
FIG_4
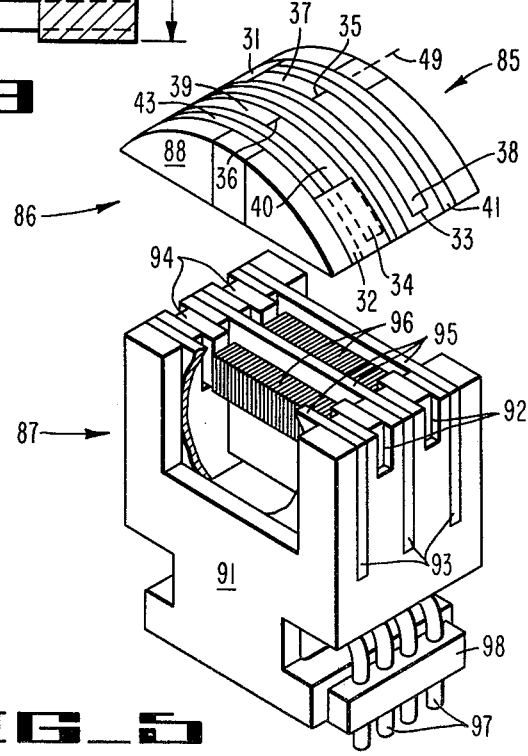
FIG_5

MULTICHANNEL TRANSDUCER STRUCTURE WITH IMPROVED INTERCHANNEL CROSS TALK REJECTION

BACKGROUND OF THE INVENTION

1. Field of Invention

The invention relates to a multichannel magnetic transducer structure with improved cross talk rejection between adjacent channels.

2. Description of the Prior Art

Multichannel transducers are generally known to employ interchannel electromagnetic shielding to reduce cross talk between adjacent channels. While these shields are reasonably effective in reducing cross talk due to leakage fields originating in the inner regions of the transducer structure, such as coils or rear gaps, they do not eliminate cross talk entirely, as well known. The conventional interchannel shields do not extend above the transducer front end surface and consequently, they are virtually ineffective for reducing cross talk caused by surface leakage fields originating, for example, from the transducing gap or from outer ends of magnetic poles of the multichannel transducer. In transducers having a plurality of closely spaced transducing channels such surface leakage fields largely contribute to the overall interchannel cross talk. As it is well known, in multichannel transducers the largest proportion of cross talk is effected between adjacent channels while more distant channels have much lesser effect since the intensity of any magnetic field, including leakage fields, progressively decreases with the square of the distance.

Some prior art multichannel transducers utilize interchannel shields extending above the front end surface of the magnetic poles. These shields might slightly improve cross talk due to surface leakage fields but at the same time they greatly increase head bumps.

There are known cross talk rejection techniques where a portion of the original electric signal of a driven channel is phase-inverted and injected in the adjacent channel. Besides the disadvantage of necessary additional electronic circuitry for phase inversion, etc., the resulting cross talk rejection is largely dependent on the phase versus frequency relationship of the original signal to the inverted signal.

According to another prior art method interchannel shields are arranged asymmetrically between channels, having their opposite ends placed in close proximity of respective opposite poles pertaining to adjacent channels. The asymmetrically arranged shields introduce a magnetic flux of opposite polarity into the adjacent channels. However, this prior art technique does not reduce cross talk resulting from surface leakage flux since these asymmetrical shields do not extend above the transducer front end surface.

SUMMARY OF THE INVENTION

Consequently, it is an object of the invention to provide a multichannel transducer structure with improved interchannel cross talk rejection, eliminating the disadvantages of the above-mentioned prior art transducers.

It is another object of the invention to provide a multichannel transducer structure in which cross talk due to surface leakage flux between adjacent channels is substantially elminated.

It is a further object to provide a multichnnel transducer structure having cross talk rejection substantially constant with frequency.

It is still another object to provide a multichannel transducer structure having the above-indicated features and not requiring additional electronic circuitry.

It is a particular object of the invention to provide a multichannel transducer structure having the above indicated features and adapted for economical production.

In accordance with the invention a multichannel magnetic transducer is provided, having a plurality of spaced channels, each channel having a pair of magnetic poles defining a transducing gap. Members of magnetic material are placed in close proximity of one pole of each pair of poles, at the front end surface of the multichannel transducer to form a low reluctance path with that pole. Each member extends substantially across that pole in the direction of a track width and is positioned at a distance from the transducing gap and associated magnetic medium, respectively, so as to prevent magnetic coupling with any of the latter elements. The magnetic members are associated alternatively with poles located on the opposite sides of the transducer front end surface gaps on adjacent channels. An asymmetric magnetic circuit is obtained in which the cross talk due to surface leakage flux induced in adjacent channels is of opposite phase relative to the cross talk originating from inner portions of the transducer. A destructive interference between the oppositely phased cross talks takes place and substantial reduction in overall interchannel cross talk results.

The foregoing and further features, objects, and advantages of the invention will be better understood from the following description with reference to the accompanying drawings in which preferred embodiments are illustrated as examples. The drawings are included for the purpose of disclosure and illustration only, and are not intended as limitation of the scope of the invention.

BRIEF DESCRIPTION OF THE DRAWINGS

FIG. 1 is a front schematic view of a prior art two channel transducer showing surface leakage fields and cross talk flux;

FIG. 2 is a front schematic view of a two channel transducer in accordance with the preferred embodiment of the invention showing cancellation of cross talk flux;

FIG. 3 is a front schematic view of a four channel transducer in accordance with another embodiment of the invention;

FIG. 4 is a plan view of a member of magnetic material in accordance with the preferred embodiment of the invention; and FIG. 5 is an exploded perspective view of a two channel transducer in accordance with the preferred embodiment of the invention.

DETAILED DESCRIPTION

FIG. 1 shows schematically the front end surface 1 of a prior art multichannel magnetic transducer, having parallel spaced transducing channels 10, 12, utilized for example, for recording or playback on an associated movable magnetic medium (not shown), for example, tape or disk. As it is well known in the art, each channel comprises a pair of confronting magnetic poles 16, 17; 18, 19; respectively, arranged in registration and having a non-magnetic material disposed between them to define a transducing gap 20, 21; respectively. Gaps 20, 21 are arranged in a common transducing gap plane forming a gap line 80. Magnetic or electromagnetic shields 11, 13, 15 are arranged adjacent to the channels 10, 12 and spaced therefrom, for example, by a non-magnetic spacer (not shown) such as an epoxy filler, as well known. Shield 13 is a conventional inter-channel shield serving to pick up leakage flux originating from the inner portions of the adjacent channels 10, 12 and to return that flux back to the original channel. Conventional outer shields 11 and 15 are utilized to protect the respective channels 10, 12 from external electromagnetic fields, as well known.

When one channel, for example channel 10 of the magnetically symmetrical prior art multichannel transducer structure 1 is driven by a recording or playback signal, leakage fields 7, 23 and 25 are respectively produced. Leakage field 7 originates from the inner portions, such as from transducing coils and rear gap of the driven channel 10. The effect of field 7 is reduced by interchannel shield 13 to an extent. The remaining portion of field 7 effects a cross talk flux 9 in channel 12, which is in phase with the original signal flux 26 of the driven channel 10. As it is well known, conventional shields 11, 13, 15 of the prior art multichannel transducer of FIG. 1 are made to flush with the front end surface 1 of the transducer and do not extend thereabove. Consequently, these shields are not effective for reducing channel-to-channel cross talk effected by surface leakage fields 23, 25 occuring immediately above the front end surface 1 of the transducer.

For better explanation of the foregoing, in FIG. 1 a portion of the surface leakage fields is represented by lines 23 and 25, respectively, as originating from the driven channel 10 and directed into the adjacent channel 12. More specifically, surface leakage field 23 originates in transducing gap 20 of channel 10; while surface leakage field 25 originates in the outer ends of magnetic poles 16, 17. It will be understood that the magnetic fields and related flux described herein are three dimensional values and consequently, only portions thereof could be shown by lines in the plane of the attached drawings.

In the above-mentioned symmetrical configuration of the prior art transducer of FIG. 1, a resulting undesirable cross talk flux 27 due to the surface leakage fields 23 and 25 is induced from the driven channel 10 into the adjacent channel 12. Cross talk 27 caused by surface leakage fields and the previously mentioned cross talk 9 originating from inner portions of channel 10, both are substantially in phase with the original signal flux 26 of channel 10. Consequently, they largely contribute to the overall cross talk of the prior art transducer. The present invention substantially eliminates the above-indicated cross talk 27 resulting from surface leakage flux as it will follow from the description below.

FIG. 2 shows schematically a front end surface 30 of a two channel transducer corresponding to the preferred embodiment of the invention. When comparing the respective front end surfaces 1 and 30 of the transducers of FIGS. 1 and 2, it is seen that both structures are similar with the exception of members 31, 32 of magnetic material attached to the front end surface 30 of the transducer of FIG. 2. These members 31, 32 in the preferred embodiment are formed as rectangular strips, and are arranged asymmetrically with respect to the adjacent transducing channels 33, 34. Each strip 31, 32 is respectively attached to one magnetic pole 37, 40 of a pair of poles, 37, 38; 39, 40; each pair forming an adjacent transducing channel 33, 34, respectively. The poles 37, 40 with the strips 31, 32 attached thereon are arranged on the opposite sides of the transducer front end surface 30. Each strip 31, 32 is in magnetic contact with the associated pole 37, 40 and also with an adjacent outer shield 41, 43, respectively. However, both strips 31, 32 are kept out of contact with the interchannel shield 42 to prevent direct magnetic coupling between the adjacent channels 10, 12 through that interchannel shield 42.

The magnetic member of the preferred embodiment of the invention formed as a rectangular strip 31 is shown in FIG. 4. It is preferably made of a generally flexible, high permeability material, such as mumetal. For example, strip 31 may be cut or stamped out of sheet material to a desired shape. Since strips 31, 32 are substantially identical, only one strip 31 is shown in FIG. 4 and will be described below. The width of strip 31 in the direction of the track width is selected such that strip 31 extends over the magnetic pole 37 and outer shield 41, while being kept at a sufficient distance from interchannel shield 42 to prevent any contact therewith. Preferably, length l is selected such that an outer end of strip 31 overlaps the sides 45, 48 of magnetic pole 37 and of outer shield 41, respectively. The opposite, inner end of strip 31 is at a sufficient distance from transducing gap 35 to avoid contact with an associated recording medium and to prevent magnetic coupling therewith, that is, the strip 31 from picking up any sub-stantial amount of useful flux between the medium and transducing gap 35.

In the preferred embodiment the thickness d of strip 31 is in the order of 2 to 6 mils. That thickness is selected as a compromise between a desired low reluctance magnetic path and low eddy current losses, respectively. Consequently, for high frequency recording, thin magnetic strips are preferable.

It follows from the foregoing disclosure that by utilizing strips 30, 31 the symmetrical magnetic circuit of the transducer of FIG. 1 changes to an asymmetrically arranged magnetic circuit of FIG. 2. Because of this asymmetrically arrangement, a cross talk flux 44 induced in channel 34 of the transducer of FIG. 2 and proportional to surface leakage fields originating from the driven channel 33, is of opposite phase with respect to the previously mentioned cross talk 9 originating from the inner portions of the transducer. Consequently, cancellation between the respective oppositely phased cross talk 44 and 9 takes place in the embodiment of FIG. 2.

For better explanation of the foregoing, line 81 in FIG. 2 represents zero magnetic potential $U=0$, thus separating respective areas of positive and negative magnetic polarity, $U>0$ and $U<0$. It is seen that magnetic potential of the same polarity is provided on opposite sides of the transducer front end surface 30 with respect to adjacent channels 33, 34 while on the same sides of surface 30 opposite magetic polarities are provided on adjacent channels. The resulting destructive interference between the cross talk 44 due to surface leakage fields and the oppositely phased cross talk 9 due to inner leakage fields effectively decreases the overall interchannel cross talk of the asymmetrical multichannel transducer structure of FIG. 2.

The above-disclosed cross talk elimination technique in accordance with the invention has a significant advantage in that the phase change provided by the magnetic members is substantially constant with frequency; and, thus, the resulting cross talk rejection is virtually frequency independent.

It has been observed with respect to various embodiments of the present invention that the shape of the magnetic member is not critical for obtaining the desired cross talk rejection in accordance with the invention. For example, when in the preferred embodiment the rectangular strips are made with opposite sides not precisely parallel or straight, the obtained results in cross talk rejection are not impaired. Other configurations of the magnetic member may include for example parallelogram, strips with rounded corners or other suitable shapes while providing the desired cross talk rejection.

As an alternative embodiment, FIG. 3 schematically shows a front end surface 50 of a multichannel transducer having four transducing channels 51 to 54 and magnetic shields 55 to 59, interspaced with the channels. With respect to the similarity between the transducer embodiments of FIGS. 2 and 3, only those portions and features of the transducer of FIG. 3 will be described which are different from the embodiment of FIG. 2.

In FIG. 3, magnetic members in form of rectangular strips 60 to 63 are attached each to one pole 70, 73, 74, 77 pertaining to adjacent transducing channels 51 to 54, respectively. Strips 60 and 63 are similar in design to strip 31 previously described and shown in FIG. 4. These strips are attached alternatively to poles located on the opposite sides of the transducer front end surface 50 on consecutive adjacent channels. Strips 60 and 63 respectively associated with the outer channels 51, 54, are attached to poles 70, 77 and adjacent outer shields 55, 59, respectively, similarly as it has been previously disclosed with respect to strips 31 and 32 of the preferred embodiment of FIG. 2. In accordance with the foregoing disclosure, the strips 60 to 63 of FIG. 3 are out of contact with any of the interchannel shields 56, 57, 58 and are disposed at a sufficient distance therefrom to avoid direct coupling between adjacent channels through an interchannel shield. Therefore, strips 61 and 62 associated with inner channels 52, 53 have a smaller width relative to the width of strips 60, 63.

When, for example, channel 51 of FIG. 3 is driven by a useful signal such as a recording or playback signal, represented by flux 65, cross talk due to surface leakage fields is induced in the adjacent channel 52, and also, in the subsequent more distant channels 53, 54. However, since the magnitude of the surface leakage fields and thus of the related cross talk progressively decreases with distance, the induced cross talk becomes substantially less significant in the more distant channels. The respective cross talks due to leakage fields originating from the inner portions of the multichannel transducer of FIG. 3 are designated by arrows 78, 79 and 99 on respective adjacent channels 52, 53, 54. As well known, the latter cross talks are in phase with the original signal flux 65 of channel 51. However, with respect to the asymmetrical channel-to-channel arrangement provided by the magnetic strips 60 to 63 in the embodiment of FIG. 3, the cross talk flux 66 and 68, respectively, due to surface leakage flux in channels 52 and 54 is of opposite phase relative to flux 65, 78 and 99, respectively. The latter is also true with respect to the polarities of cross talk flux induced in all subsequent odd numbered channels such as the fifth, seventh, etc., channel from the driven channel 51. Since the respective cross talk fluxes 66, 78; 68, 99 in the respective channels 52, 54 are oppositely phased with respect to each-other, they are substantially eliminated.

Since channel 53 is arranged symmetrically with respect to the driven channel 51, that is the respective magnetic strips 60, 62 are on the same side of the transducer front end surface 50, the induced cross talk 67 due to surface leakage field is of the same polarity with previously mentioned cross talk 79 originating from the transducer inner portions. The latter is also true with respect to further even numbered channels, such as fourth, sixth, etc., from the driven channel 51 if a transducer with greater number of channels is utilized. Thus the cross talk due to surface leakage fields in the latter even numbered channels is not eliminated but rather the respective cross talk components are added together. It will be understood that the latter effect in most applications is not objectionable since, as well known, the amount of cross talk progressively decreases with distance from the source of the leakage flux, and consequently, the overall improvement in cross talk between immediately adjacent channels in accordance with the invention compensates for a relative increase between more distant channels.

For example, in an embodiment of the present invention in accordance with FIG. 3, whose magnetic poles and cores were made of ferrite and magnetic strips of mumetal, the following improvement in cross talk has been measured relative to a prior art transducer of similar structure but not utilizing the magnetic strips. When measured on a four channel transducer with centers of adjacent channels 130 mil apart, a channel-to-channel improvement in cross talk rejection from $-40$ dB to $-50$ dB has been obtained while a relative increase in cross talk from two channels apart has been obtained from $-70$ dB to $-60$ dB.

It will be appreciated by those skilled in the art that the above-indicated improved cross talk rejection between adjacent channels significantly improves the quality of recording and playback when utilizing a multichannel transducer in accordance with the invention. Also, it will be understood that in some applications such as in analog instrumentation recording or digital recording on high density narrow tracks, the relative decrease in cross talk rejection between more distant channels is sufficiently compensated for by the relative improvement in cross talk between adjacent channels.

FIG. 5 illustrates a preferred embodiment of the invention represented by a two channel transducer 85 utilized for magnetic recording and/or playback. Transducer 85 is of a well known conventional structure except for the magnetic members 31, 32 and their combination with the respective transducer elements.

FIG. 5 shows an exploded view of transducer 85, having a front end surface similar to that previously described with reference to FIG. 2. To facilitate comparison, corresponding elements of both FIGS. 2 and 5 are designated by corresponding reference numerals. Transducer 85 comprises a magnetic pole tip assembly 86 and a back core assembly 87. The back core assembly 87 comprises a non-magnetic holder 91, for example of aluminum, having slots 92 and 93 for accommodating magnetic cores 94 and shields 95, respectively, as well known. Transducing coils 96, such as for recording or playback are placed around each back core leg. In FIG. 5 a magnetic shield has been broken away for better clarity of representation of the back core structure.

Transducer coil terminals 97 are attached to a terminal board 98 in a known manner.

The pole tip assembly 86 comprises a holder 88 of non-magnetic material, such as aluminum, having slots for accommodating pole pairs 37, 38; 39, 40 of magnetic shields 41, 42 and 43, respectively, as well known in the art. The above-indicated pole pairs accurately define transducing gaps 35, 36 respectively, for example made of mica or glass. As an example, poles 37, 38, 39, 40 and cores 94 may be made of ferrite or laminated mumetal, respectively, and shields 41, 42, 43 and 95 of laminated mumetal.

The pole tip assembly 86 and back core assembly 87 are joined together into a rigid unitary structure, for example by epoxy binder, as it is well known in the art. The resulting multichannel transducer structure 85 has the magnetic pole pairs 37, 38; and 39, 40; respectively, precisely aligned and in intimate contact with a corresponding back core 94. Similarly, the shields 41, 42 and 43 are precisely aligned with the back core shields 93, respectively, as it is well known.

The transducer 85 is contoured at the front end surface to obtain a desired transducer-to-medium interface. Subsequently, the contoured surface is lapped and polished as well known in the art. Then, magnetic strips 31, 32 are securely and rigidly attached to poles 37, 40 respectively located on the opposite sides of the transducer front end surface. The strips 31, 32 are preferably made of mumetal and are attached to the poles 37, 40 by a suitable adhesive, such as of type Eastman 9-10, manufactured by Eastman Kodak Corporation. To assure the best possible contact over the entire joined surface of the strips 31, 32 with the transducer surface, a uniform pressure is applied to the strips until the adhesive hardens. For example a suitable fixture may be utilized or alternatively, manual pressure may be applied on the strip if a fast hardening adhesive is utilized.

It has been found that for most effective cross talk rejection a close magnetic contact that is, minimum spacing between the magnetic pole and attached magnetic member has to be maintained, to minimize reluctance of the asymmetric circuit.

In applications where the multichannel transducer has a contoured front end surface, as shown in FIG. 5, for example for in-contact magnetic tape recording, it is preferable to make the magnetic strip of a generally flexible material, for example mumetal. The latter feature allows to adapt the surface of the magnetic member to the transducer contour, while a desirable close contact is obtained. Simultaneously cracking or breaking of the member is eliminated. The latter undesirable effects might occur when utilizing a hard, stiff, brittle magnetic material, such as ferrite.

The following examples show substantial improvement in cross talk rejection in a two channel transducer in accordance with the embodiment of FIG. 5, is being compared to prior art transducers. The back cores and pole tips of the particular transducer measured were made of MnZn ferrite and the magnetic strips and shields of mumetal. For comparison the same respective measurements were provided under identical conditions on a prior art transducer of similar structure but not utilizing the magnetic strips.

First, playback cross talk was measured as follows. One track of the two channel transducer has been prerecorded on magnetic tape at 1 kHz and at a reference recording signal level. That prerecorded signal has been played back by channel 2, while simultaneously measuring cross talk induced in channel 1 relative to the reference playback signal level of channel 2. Then the tape was turned over and the prerecorded track was played back by channel 1 and cross talk was measured on channel 2 of the transducer. The results were as follows:

| Measured On: | Cross Talk With Strips: | Without Strips: |
| --- | --- | --- |
| Channel 1: | −81 dB | −61 dB |
| Channel 2: | −85 dB | −59 dB |

Thereafter a combined recording and playback cross talk was measured as follows. Track 1 on tape was prerecorded at 1 kHz and at a predetermined reference signal level, while on track 2 only the recording bias signal was recorded. Then both prerecorded tracks 1 and 2 were played back by respective transducer channels 1 and 2 and the cross talk level present in the playback signal of channel 2 was measured with respect to the playback signal level of channel 1. Then the tape was turned over with respect to the transducer channels 1 and 2 and the respective playback signal measurements were repeated on channel 1 with reference to channel 2. The results were as follows:

| Combined Cross Talk: | With Strips: | Without Strips: |
| --- | --- | --- |
| Recording on track 1; Bias on track 2; Cross talk measured on channel 2: | −80 dB | −60 dB |
| Recording on track 2; Bias on track 1; Cross talk measured on channel 1: | −81 dB | −57 dB |

It will be understood that the above-indicated difference in overall resulting cross talk values between adjacent channels are due to minute differences between channel-to-channel characteristics of the transducer structure, as well known in the art.

It is seen from the foregoing examples that a cross talk reduction of 20 dB, that is a ratio 10:1 and higher has been obtained between adjacent channels of a two-channel transducer in accordance with the preferred embodiment of the invention.

It will be understood from the foregoing disclosure that the obtained cross talk rejection in accordance with the invention may vary with respect to the physical configuration and dimensions of the transducer utilized, characteristics and parameters of the driving electromagnetic signal such as frequency, magnitude, etc., as well as with the permeability and other pertinent parameters of the respective magnetic materials utilized for the individual transducer elements. For example, the higher is the permeability of the magnetic members, the more effective becomes the cross talk rejection between adjacent channels.

As it is well known, prior art multichannel magnetic transducers having poles and cores made of ferrite typically have more interchannel cross talk than transducers made of metallic material, such as mumetal. The above effect is primarily due to the relatively low permeability of ferrite and consequently large leakage fields. It will be understood that while a significant channel-to-channel cross talk reduction may be obtained in accordance with the present invention for any type of ferramagnetic material utilized for the individual portions of the transducer, the most significant improvement has been achieved with transducers having relatively low permeability poles and/or cores, and utilizing relatively high permeability magnetic members.

While the preferred and alternative embodiments of the invention have been described and shown as utilizing conventional electromagnetic shielding, it is noted that a transducer with magnetic strips in accordance with the invention does have an improved cross talk rejection even if such interchannel shields are deleted. However, the overall cross talk rejection obtained in such transducer would be much lower since the leakage flux originating from the inner portions of the multichannel transducer structure would not be reduced.

Likewise, cross talk rejection as previously described will be obtained when utilizing magnetic strips in accordance with the invention in combination with a multichannel transducer whose transducing gaps are not arranged along a common gap line.

As previously mentioned, the magnetic members in accordance with the invention may have a different form or shape from that of the preferred embodiment. For example, relatively thin plates of magnetic material of various desired shapes may be utilized. The thickness of the members should be selected as a compromise between desired low reluctance of the asymmetric magnetic path and low associated eddy current losses.

Instead of attaching discrete members of magnetic material to the multichannel transducer poles, as previously described, a layer of suitable magnetic material such as mumetal or permalloy may be directly deposited in a desired shape and thickness on the transducer front end surface. Well known deposition techniques, such as vacuum deposition or sputtering may be utilized. It will be understood that a suitable mask is needed to cover the rest of the surface during the depositing process. The latter techniques eliminate the physical spacing between the magnetic members and poles, thus lowering the reluctance of the resulting asymmetric magnetic circuit path and improving the efficiency of overall cross talk rejection.

It will become apparent from the foregoing disclosure that transducers in accordance with the invention are useful for a large variety of applications, such as in audio, instrumentation, video or other types of multichannel analog or digital recording on tape, disk, etc.

Although the invention has been described in conjunction with preferred embodiments it will be appreciated that various modifications and arrangements of elements may be made without departing from the spirit and scope of the invention as defined by the appended claims.

I claim:

1. A multichannel magnetic transducer structure having a plurality of spaced transducing channels, each channel having a pair of magnetic poles defining a transducing gap therebetween, a magnetic back core contiguous with the poles and an associated transducing winding, comprising in combination:
a plurality of members of magnetic material firmly attached to said transducer structure at a front end surface thereof, each member being associated with one magnetic pole of each pair of poles and provided in close proximity thereof to form a low reluctance magnetic path therewith, each member extending substantially across said associated pole in the direction of a recording track width and provided at a distance from both said transducing gap and from an associated magnetic medium to prevent magnetic coupling therewith, respectively, said members of magnetic material being associated alternatively with poles located on the opposite sides of said transducer front end surface on consecutive adjacent channels to form an asymmetrical multichannel magnetic transducer structure.

2. The multichannel transducer structure of claim 1 having interchannel magnetic shields provided between adjacent transducing channels, wherein said members of magnetic material are arranged out of contact with said interchannel magnetic shields.

3. The multichannel transducer structure of claim 1 or 2 having outer magnetic shields respectively arranged adjacent to outermost transducing channels, wherein each said member of magnetic material extending substantially across the magnetic pole of an outermost channel also extends substantially across said adjacent outer magnetic shield in the direction of track width and in close proximity thereof to form a low reluctance magnetic path therewith.

4. The multichannel transducer structure of claim 3 wherein said multichannel transducer has back cores made of magnetic ferrite and said strips, poles and interchannel and outer shields made of mumetal, respectively.

5. The multichannel transducer structure of claim 1 wherein said magnetic members have a permeability at least equal to that of said magnetic poles.

6. The multichannel transducer structure of claim 1 wherein said magnetic members have a relatively small dimension in the direction substantially normal to said transducer front end surface relative to their other dimensions.

7. The multichannel transducer structure of claim 1 wherein said members of magnetic material are formed as strips of a generally flexible magnetic material.

8. The multichannel transducer structure of claim 7 wherein said strips are made of a high permeability metallic magnetic material.

9. The multichannel transducer structure of claim 6 wherein said strips are made of magnetic sheet material and are attached to said magnetic poles by means of an adhesive.

10. The multichannel transducer structure of claim 1 wherein each said member of magnetic material is provided by a layer of magnetic material deposited directly on said transducer front end surface.

11. The multichannel transducer structure of claim 10 wherein said members of deposited magnetic material are of a substantially rectangular shape having a width substantially in the direction of track width, a length substantially in the direction of track length and a small thickness relative to said other two dimensions.

12. The multichannel transducer structure of claim 10 or 11 wherein said layer of magnetic material is formed of mumetal or permalloy.

13. A magnetic transducer structure having two adjacent spaced parallel transducing channels, each channel having a pair of confronting magnetic poles defining a transducing gap therebetween, a magnetic core contiguous with the poles, a transducing winding associated with the core, an interchannel magnetic shield provided between said transducing channels, and outer magnetic shields each provided adjacent to one said transducing channel, respectively, comprising in combination:

a member of magnetic material attached at a front end surface of the transducer to one pole of each said pair of poles and to said adjacent outer shield to form a low reluctance magnetic path therewith, respectively, said members being attached to poles provided on the opposite sides of said transducer front end surface with respect to each-other, each said member extending substantially across said pole and adjacent outer shield in the direction of a track width and provided at a distance from said transducing gap, associated magnetic medium and interchannel shield, respectively, to prevent magnetic coupling therewith.

14. A magnetic transducer structure having a plurality of spaced parallel transducing channels, each channel having a pair of confronting magnetic poles defining a transducing gap therebetween, a magnetic core contiguous with the poles, a transducing winding associated with the core and a plurality of interchannel magnetic shields provided between adjacent transducing channels, comprising in combination:

a plurality of magnetic members, each member being attached to one pole of each said pair of poles at a front end surface of the transducer to provide a low reluctance magnetic path with said pole, each member extending substantially across said pole in the direction of a track width, and at a distance from said transducing gap, from an associated magnetic medium and out of contact with said interchannel shields to prevent magnetic coupling therewith, respectively, said members of magnetic material being attached alternatively to poles provided on the opposite sides of said transducer front end surface on consecutive adjacent channels to form an asymmetrical multichannel transducer structure.

15. The multichannel transducer structure of claim 14 having outer magnetic shields respectively arranged adjacent to outermost channels of said multichannel transducer, wherein each said member of magnetic material attached to a magnetic pole of an outermost channel is also attached to and extends substantially across said adjacent outer magnetic shield in the direction of track width to form a low reluctance magnetic path with said outer shield.

16. The magnetic transducer structure of claim 13, 14 or 15 wherein each said magnetic member is formed as a strip of generally flexible magnetic material attached at said transducer front end surface by means of an adhesive.

17. The magnetic transducer structure of claim 13, 14 or 15 wherein each said magnetic member is provided by a layer of magnetic material deposited directly on said transducer front end surface.

* * * * *